(12) United States Patent
Hepworth et al.

(10) Patent No.: US 7,346,605 B1
(45) Date of Patent: Mar. 18, 2008

(54) METHOD AND SYSTEM FOR SEARCHING AND MONITORING INTERNET TRADEMARK USAGE

(75) Inventors: James L. Hepworth, Boise, ID (US); Faisal Shah, Boise, ID (US)

(73) Assignee: MarkMonitor, Inc., Boise, ID (US)

( * ) Notice: Subject to any disclaimer, the term of this patent is extended or adjusted under 35 U.S.C. 154(b) by 0 days.

(21) Appl. No.: 09/612,766

(22) Filed: Jul. 10, 2000

Related U.S. Application Data

(63) Continuation-in-part of application No. 09/359,924, filed on Jul. 22, 1999.

(51) Int. Cl.
*G06F 7/00* (2006.01)
*G06F 15/00* (2006.01)

(52) U.S. Cl. ............ 707/3; 707/4; 707/5; 707/10; 715/501.1; 715/513; 709/217; 709/218; 709/219

(58) Field of Classification Search .......... 707/1–10, 707/500; 715/501.1, 513; 709/217–219
See application file for complete search history.

(56) References Cited

U.S. PATENT DOCUMENTS

| | | | | |
|---|---|---|---|---|
| 4,972,349 A | * | 11/1990 | Kleinberger | ............ 707/1 |
| 5,062,074 A | * | 10/1991 | Kleinberger | ............ 707/5 |
| 5,542,087 A | | 7/1996 | Neimat et al. | |
| 5,764,906 A | | 6/1998 | Edelstein et al. | |
| 5,819,271 A | | 10/1998 | Mahoney et al. | |
| 5,842,206 A | * | 11/1998 | Sotomayor | ............ 707/5 |
| 5,848,410 A | * | 12/1998 | Walls et al. | ............ 707/3 |
| 5,864,676 A | * | 1/1999 | Beer et al. | ............ 709/229 |
| 5,864,845 A | * | 1/1999 | Voorhees et al. | ............ 707/5 |
| 5,881,131 A | * | 3/1999 | Farris et al. | ............ 379/15.03 |
| 5,898,836 A | | 4/1999 | Freivald et al. | |
| 5,903,861 A | * | 5/1999 | Chan | ............ 704/9 |
| 5,913,215 A | | 6/1999 | Rubinstein et al. | |
| 5,950,173 A | | 9/1999 | Perkowski | |
| 5,999,940 A | * | 12/1999 | Ranger | ............ 707/104.1 |
| 6,009,459 A | * | 12/1999 | Belfiore et al. | ............ 707/10 |
| 6,175,830 B1 | * | 1/2000 | Maynard | ............ 707/5 |

(Continued)

OTHER PUBLICATIONS

Eakins et al., "Similarity Retrieval of Trademark Images"—MUltimedia—IEEE Apr.-Jun. 1998 (pp. 53-63).*

(Continued)

*Primary Examiner*—Cam Y Truong
*Assistant Examiner*—Anh Ly
(74) *Attorney, Agent, or Firm*—Townsend and Townsend and Crew

(57) ABSTRACT

A system for searching and reporting an incidence of at least one trademark, tradename, celebrity name, and/or famous name on the Internet, which includes a computer system having a connection to the Internet, and a software program executing on the computer system. The software program is adapted to receive an input of at least one trademark, tradename, celebrity name, and famous name to be searched. The software program then creates a search string including at least one trademark, tradename, celebrity name, and famous name. The software program also receives a URL address of a Web page on the Internet to be searched. The software program accesses and searches the Web page for hits corresponding to the search string, and then provides the search results of identified hits within the Web page.

8 Claims, 7 Drawing Sheets

AltaVista Results

| Rank | Hits | URL | Analyze Site | Meta Tag | Hidden Text | Text | Title |
|---|---|---|---|---|---|---|---|
| 1 | 7 | http://www.markfamusworld.com/index2.html | eSITEmonitor | 5 | 1 | 0 | 1 |
| 2 | 0 | http://www.markfamus.co.jp/ | eSITEmonitor | 0 | 0 | 0 | 0 |
| 3 | 8 | http://www.markfamus.ru/ | eSITEmonitor | 0 | 2 | 5 | 1 |
| 4 | 17 | http://www.markfamusnorcal.com/ | eSITEmonitor | 6 | 6 | 3 | 2 |
| 5 | 1 | http://www.markfamus.be/ | eSITEmonitor | 0 | 0 | 0 | 1 |
| 6 | 47 | http://www.markfamus.co.uk/servlet/markfamus | eSITEmonitor | 0 | 25 | 21 | 1 |
| 7 | 15 | http://www.markfamus.com/whiete/markfamus.html | eSITEmonitor | 0 | 0 | 14 | 1 |
| 8 | 0 | http://www.markfamusrhouse.com/ | eSITEmonitor | 0 | 0 | 0 | 0 |
| 9 | 5 | http://www.markfamusworld.com/markfamus.htm | eSITEmonitor | 2 | 0 | 0 | 3 |
| 10 | 2 | http://www.markfamusknife.com/ | eSITEmonitor | 0 | 1 | 0 | 1 |

U.S. PATENT DOCUMENTS

| | | | |
|---|---|---|---|
| 6,029,175 A * | 2/2000 | Chow et al. | 707/104.1 |
| 6,029,192 A | 2/2000 | Hill et al. | |
| 6,041,326 A * | 3/2000 | Amro et al. | 707/10 |
| 6,092,074 A * | 7/2000 | Rodkin et al. | 707/102 |
| 6,119,124 A | 9/2000 | Broder et al. | |
| 6,141,653 A * | 10/2000 | Conklin et al. | 705/80 |
| 6,144,962 A * | 11/2000 | Weinberg et al. | 707/10 |
| 6,148,289 A * | 11/2000 | Virdy | 707/3 |
| 6,151,624 A | 11/2000 | Teare et al. | |
| 6,154,738 A | 11/2000 | Call | |
| 6,161,130 A | 12/2000 | Horvitz et al. | |
| 6,199,048 B1 | 3/2001 | Hudetz et al. | |
| 6,199,102 B1 | 3/2001 | Cobb | |
| 6,219,818 B1 * | 4/2001 | Freivald et al. | 707/10 |
| 6,230,168 B1 * | 5/2001 | Unger et al. | 715/501.1 |
| 6,237,144 B1 * | 5/2001 | Delo | 707/10 |
| 6,256,623 B1 * | 7/2001 | Jones | 707/3 |
| 6,266,668 B1 * | 7/2001 | Vanderveldt et al. | 707/10 |
| 6,282,549 B1 * | 8/2001 | Hoffert et al. | 707/3 |
| 6,298,341 B1 * | 10/2001 | Mann et al. | 707/3 |
| 6,311,182 B1 * | 10/2001 | Colbath et al. | 707/6 |
| 6,338,082 B1 * | 1/2002 | Schneider | 709/203 |
| 6,385,615 B1 * | 5/2002 | Haeri et al. | 707/10 |
| 6,389,458 B2 * | 5/2002 | Shuster | 709/213 |
| 6,392,668 B1 * | 5/2002 | Murray | 715/738 |
| 6,401,118 B1 * | 6/2002 | Thomas | 707/4 |
| 6,412,014 B1 | 6/2002 | Ryan | |
| 6,421,733 B1 * | 7/2002 | Tso et al. | 709/217 |
| 6,442,523 B1 * | 8/2002 | Siegel | 704/270 |
| 6,487,553 B1 * | 11/2002 | Emens et al. | 707/103 R |
| 6,516,312 B1 * | 2/2003 | Kraft et al. | 707/3 |
| 6,564,253 B1 * | 5/2003 | Stebbings | 709/217 |
| 6,611,830 B2 * | 8/2003 | Shinoda et al. | 707/3 |
| 6,629,092 B1 * | 9/2003 | Berke | 707/3 |
| 6,631,357 B1 * | 10/2003 | Perkowski | 705/26 |
| 6,643,641 B1 * | 11/2003 | Snyder | 707/4 |
| 6,654,751 B1 * | 11/2003 | Schmugar et al. | 707/10 |
| 6,704,722 B2 * | 3/2004 | Wang Baldonado | 707/3 |
| 6,751,606 B1 * | 6/2004 | Fries et al. | 707/3 |
| 6,760,746 B1 * | 7/2004 | Schneider | 709/203 |
| 2002/0147724 A1 * | 10/2002 | Fries et al. | 707/100 |
| 2002/0147880 A1 * | 10/2002 | Wang Baldonado | 711/1 |
| 2002/0156774 A1 * | 10/2002 | Beauregard et al. | 707/3 |
| 2002/0174132 A1 * | 11/2002 | Silverman | 707/104.1 |
| 2002/0194116 A1 * | 12/2002 | Coakley | 705/37 |
| 2004/0019535 A1 * | 1/2004 | Perkowski | 705/27 |
| 2005/0004889 A1 * | 1/2005 | Bailey et al. | 707/1 |
| 2005/0004897 A1 * | 1/2005 | Lipson et al. | 707/3 |
| 2005/0289140 A1 * | 12/2005 | Ford et al. | 707/5 |
| 2006/0011716 A1 * | 1/2006 | Perkowski | 235/375 |
| 2006/0059166 A1 * | 3/2006 | Sieffert et al. | 707/10 |

OTHER PUBLICATIONS

Eakins et al., "Retrieval of trade Mark images by Shape feature-the Artisan Project", Intelligent Image Databases, IEE Collogulum on May 22, 1996, London, UK May, 22, 1996 (pp. 9/1-9/6.*

Bridoux et al., "Logo and Word Matching Using a General Approach to Signal Registration" 1997 IEEE (pp. 61-65).*

"Seek and Ye Shall Find (Maybe)"—Steve G. Steinberg—WIRED, vol. 4, #5, May 1996 (pp. 1-12).*

"Experiences with Selecting Search Engines using Metasearch", Dreilinger et al. ACM Press, ACM Transactions on Information Systems (TIOS), vol. 15, Issue 3 Jul. 1997 (pp. 195-222).*

U.S. Appl. No. 10/427,194, filed Nov. 2, 2006, 19 pages.

Author Unknown, The Unfair Advantage Book on Winning The Search Engine Wars, Planet Ocean Communications, May 1, 1999, version SE32, 100 pages.

Davis III, G. Gervaise, "Internet Domain Names And Trademarks: Agrowing of Domestic and International Disputes", G. Gervais Davis III, Esq. Chapter Eleven, 1997-98, pp. 1-24.

Intellectual Property Network, Query is (search engine), IBM, printed date May 27, 1999, 4 pages.

Kuestar, J, et al., "Hyperlinks, Frames and Meta-Tags: An Intellectual Property Analysis", IDEA: The Journal of Law and Technology 1998, 38 IDEA 243, 29 pages.

Meeks, Brock N., "Scam diverts surfers to porn sites", MSNBC, May 18, 1999, 5 pages.

Sandburg, Brenda, "Do WIPO Trademark Rules Go Far Enough?", NLP IP Company, Tuesday, May 4, 1999, 3 pages.

U.S. Appl. No. 09/612,766, filed Apr. 18, 2007, 22 pages.

* cited by examiner

This MARKMonitor™ service allows you to search for your trademark, tradename or name on up to ten search engines and receive up to 500 results per search engine.

Search Criteria

Search Terms: markfamus

Results per Search Engine: 10

Client ID / Description: xyz

How often should this report be run? Only once

Search Engines to Use

☑ Alta Vista  ☐ Excite
☑ Infoseek    ☐ Lycos
☐ Northern Light  ☐ Yahoo
☐ Hotbot      ☐ LookSmart
☐ Snap        ☐ GoTo

Submit

FIG. 3A

AltaVista Results

| Rank | Hits | URL | Analyze Site | Meta Tag | Hidden Text | Text | Title |
|---|---|---|---|---|---|---|---|
| 1 | 7 | http://www.markfamusworld.com/index2.html | eSITEmonitor | 5 | 1 | 0 | 1 |
| 2 | 0 | http://www.markfamus.co.jp/ | eSITEmonitor | 0 | 0 | 0 | 0 |
| 3 | 8 | http://www.markfamus.ru/ | eSITEmonitor | 0 | 2 | 5 | 1 |
| 4 | 17 | http://www.markfamusnorcal.com/ | eSITEmonitor | 6 | 6 | 3 | 2 |
| 5 | 1 | http://www.markfamus.be/ | eSITEmonitor | 0 | 0 | 0 | 1 |
| 6 | 47 | http://www.markfamus.co.uk/servlet/markfamus | eSITEmonitor | 0 | 25 | 21 | 1 |
| 7 | 15 | http://www.markfamus.com/whiete/markfamus.html | eSITEmonitor | 0 | 0 | 14 | 1 |
| 8 | 0 | http://www.markfamusrhouse.com/ | eSITEmonitor | 2 | 0 | 0 | 0 |
| 9 | 5 | http://www.markfamusworld.com/markfamus.htm | eSITEmonitor | 0 | 1 | 0 | 3 |
| 10 | 2 | http://www.markfamusknife.com/ | eSITEmonitor | 0 | 0 | 0 | 1 |

FIG. 3B

InfoSeek Results

| Rank | Hits | URL | Analyze Site | Meta Tag | Hidden Text | Text | Title |
|---|---|---|---|---|---|---|---|
| 1 | 1 | http://www.markfamusco.com/ | eSITEmonitor | 0 | 0 | 0 | 1 |
| 2 | 1 | http://www.markfamus.com.au/ | eSITEmonitor | 0 | 0 | 0 | 1 |
| 3 | 9 | http://www.markfamusarena.com/ | eSITEmonitor | 1 | 0 | 7 | 1 |
| 4 | 18 | http://www.markfamus.com/famousname/ | eSITEmonitor | 4 | 2 | 11 | 1 |
| 5 | 0 | http://www.markfamusmenace.com/ | eSITEmonitor | 0 | 0 | 0 | 0 |
| 6 | 10 | http://www.markfamus.net/~markfamus/index.html | eSITEmonitor | 0 | 1 | 8 | 1 |
| 7 | 0 | http://www.markfamus.com/ | eSITEmonitor | 0 | 0 | 0 | 0 |
| 8 | 0 | http://147.8.1891.30:1234/project64.html | eSITEmonitor | 0 | 0 | 0 | 0 |
| 9 | 15 | http://www.markfamus.com/features/ | eSITEmonitor | 1 | 0 | 14 | 0 |
| 10 | 1 | http://429.8.1041.30:1234/project25.html | eSITEmonitor | 0 | 1 | 0 | 0 |

FIG. 3C

METHOD AND SYSTEM FOR SEARCHING AND MONITORING INTERNET TRADEMARK USAGE

RELATED U.S. APPLICATION DATA

This is a continuation-in-part of application Ser. No. 09/359,924, filed Jul. 22, 1999.

BACKGROUND OF THE INVENTION

1. Field of the Invention

The present invention provides a process and an apparatus for: (1) comprehensively searching the Internet for uses of trademarks, tradenames, celebrity and/or famous names; (2) comprehensively searching the Internet for potentially infringing uses of trademarks in domain names and other Web page content as it relates to homonym and phonetic equivalents; (3) comprehensively searching the Internet for potentially infringing uses of trademarks, tradenames, celebrity and/or famous names as it relates to homonyms and phonetic equivalents; and (4) comprehensively searching the Internet for uses of trademarks, tradenames, celebrity and/or famous names as they relate to images.

2. Description of the Related Art

The rapid rise of the Internet has created an explosion of information and commercial speech and with it an increase of intellectual property issues, particularly trademark issues. The earliest form of this issue was (and is) the conflict between domain name rights and trademark rights. Under our present system of registration, any party ("Registrant") can register with InterNIC (a federal government organization established to register the domain name database) to own any domain name, regardless of trademark ownership, affiliation or association with such name. As a result, Registrants would register hundreds of domain names with InterNIC with the primary goal of selling these same names back to the individuals and/or companies that actually own the same registered trademark. These types of Registrants have been referred to as "Cybersquatters". While a loose mechanism exists in the form of a dispute resolution policy to dispute the "land rush" domain name claims, there still is a need to understand and monitor how trademark rights (either registered in a particular country or based upon common law rights) are being enforced and used on the Internet.

The Internet is mostly comprised of, among other things, the Web, Newsgroups, and FTP. The Web is comprised mostly of Web pages that are constructed using HTML. This language is written using codes or tags which allow a Web page to be viewed in a coherent or logical fashion. This is also the programming language that allows a user to "jump" or "hyperlink" from one Web page to another with the click of the mouse. These codes or tags are hidden from view from the individual user viewing the Web page. Also hidden from view are image tags, hidden text, titles and URLs of the Web page. The reason the user does not see this hidden tag, text, title and URL is so that the user can interface with the Web in a "point and click" fashion. Presently, there are over 500 million Web pages on the Internet and this number is growing exponentially each year.

Search engines (e.g., Yahoo!, Lycos, Infoseek, etc.) are Internet portals that catalog Web sites on the Internet in a "search, store and retrieve fashion". First, the search engine searches or "crawls" the Internet and gathers available Web pages on the Internet. The Web pages are then stored and cataloged in that particular search engines' database based on certain criteria (i.e., how frequent keywords appear in either the hidden text, text, meta-tag, title or URL of the Web page). This function enables the search engine to then retrieve a relevant indexed Web page when a keyword query is entered by an end user. Search engines determine relevancy by giving different values to the above criteria (i.e., one search engine may index Web pages in accordance with how many times a keyword appears in the hidden text of a Web page while another search engine may index its Web pages in accordance with how many times a keyword appears in the text of a Web page). This is why when a keyword is entered on one search engine, this search engine may return results and rank Web sites differently than on other search engines. Some search engines also rank other Web Sites based on criteria such as link popularity (i.e. how many Web Sites are linking to that particular Web Site based on a certain keyword). Drawing large amounts of Internet traffic is the primary goal of most if not all Web sites. It is therefore critical that a Web site be easily located and be ranked as high as possible on an end user's search result list.

Companies and individuals have taken advantage of these programmed searches performed by search engines by inserting registered trademarks, tradenames, celebrity and/or famous names as meta-tag keywords or as hidden words within the Web page itself. In addition to hidden text or words within the Web page itself, a Web site may also contain registered trademarks, tradenames, celebrity and/or famous names in the URL or the title of the Web page, and may contain a reference to an image (in the form of a trademark, tradename, celebrity and/or famous name), which image can be viewed by the end user. By using the registered trademarks, tradenames, celebrity and/or famous names in the hidden text, meta-tags, titles, URLs, and image text, third-party Web sites are able to cleverly draw traffic away from authorized Web pages. For example, assuming a search engine indexes its Web pages in accordance with how frequent a keyword appears in the meta-tag of a Web page and assuming a registered trademark that is owned by party A is listed in a meta-tag numerous times in an unrelated Web site run by party B, it is more than likely that if an unknowing user of the Internet enters a query on a standard search engine seeking all Web sites related to that particular trademark, then, the search report will return a list of Web sites with the unrelated site of party B as the top site among such Web sites. This result confuses the end user in that he or she believes that the first listed Web site of party B may, in fact, be endorsed or associated to party "A", the actual owner of the registered trademark.

As discussed above, search engines typically index Web sites in their database in accordance with several factors, including, but not limited to, the frequency of the number of keywords appearing in the hidden programming code and text of a Web site. Web site programmers take advantage of this indexing method by the search engines by programming their Web site's HTML source code to include irrelevant keywords in their Web site's title, meta-tags, text, and hidden text. As a result, a keyword search query entered into a search engine may yield results that place the irrelevant site higher on the list of search results than the company's authorized site which the user actually desires to find. This result can divert valuable traffic away from the authorized site.

The need to draw high levels of Internet traffic to one's Web site has resulted in the practice of "Spamdexing". This is a technique used by Web site owners to bring their Web site to the top of a list of search results. The practice involves repeating keywords over and over in text usually at the top of a Web page and/or at the bottom of a Web page in very small letters. It also involves repeating keywords in meta-tags, addresses, hidden text, titles or URLs. These keywords are frequently registered trademarks. If a Web site is able to successfully "spamdex" its Web site by the use of unauthorized trademarks, it can draw higher traffic to its Web site. Given such practices as "spamdexing" and other techniques using registered trademarks, tradenames, celebrity and/or famous names to draw Internet traffic to third-party Web sites, there is a need in the art to provide a means for enforcing trademark rights within the whole Internet.

SUMMARY OF THE INVENTION

The present invention provides a process for searching and reporting the incidence of trademarks, tradenames, celebrity and famous names on the Internet, comprising:

(a) providing the trademark, tradename, celebrity or famous name to be searched;

(b) determining a plurality of homonyms and phonetic equivalents of the trademark, tradename, celebrity or famous name to be searched to create a search string consisting of the trademark, tradename, celebrity or famous name, its homonyms and its phonetic equivalents;

(c) searching the Internet with a plurality of search engines with the search string that searches URLs, meta-tags, hidden text, text, titles, domain names and images in order to identify a relevant URL with hits;

(d) crawling the URL and domain names sites having hits; and (e) providing the search results consisting of identified hits and location within each domain name.

Preferably, the search results are broken down into the number and identity of hits selected from the group consisting of URLs, meta-tags, hidden text, text, titles, domain names, hyperlinks, detail notes, and images and combinations thereof. Preferably, the trademark, tradename, celebrity or famous name to be searched is provided on an encrypted connection that is authenticated by a certificate server (SSL). Preferably, the plurality of search engines are selected from the group consisting of Yahoo!, LookSmart, Mining Co., Goto, Thunderstone, Dogpile Open Directory, Infoseek, Infoseek Ultra, Excite, Excite Guide, Alta Vista, Lycos, Lycos A2Z Directory, Webcrawler, What U Seek, Magellan, NetGuide, Galaxy, Open Text, HotBot, Point, REX, Northern Light, AskJeeves, Go, Inktomi Powered Engines and combinations thereof.

The present invention further provides an apparatus for searching for uses of trademarks, tradenames, celebrity and famous names on the Internet for a client, comprising:

(a) a plurality of database servers wherein the database servers store information of searching activity, including the identity of the client and identity of domain names and URLs having discovered hits relating to a trademark, tradename, celebrity or famous name or homonyms or phonetic equivalents related thereto;

(b) a plurality of crawler servers wherein the crawler servers comprise a search engine, and wherein the crawler servers are connected to the database servers and the Internet and function to crawl Internet sites and Web pages identified by previous hits from search engines, crawlers or database servers; and (c) one or a plurality of user servers that comprise a program for determining a plurality of homonyms and phonetic equivalents of a particular trademark, tradename, celebrity and/or famous name to be searched.

Preferably, the apparatus further comprises a means for encryption of communication between the user server and the client. Preferably, the client comprises a server that will communicate with the user server(s) by means of an Internet Web site.

According to an embodiment of the present invention, a method of searching and reporting the incidence of at least one trademark, tradename, celebrity name, and/or famous name on the Internet includes the step of providing at least one trademark, tradename, celebrity name, and famous name to be searched. A search string is created that includes at least one trademark, tradename, celebrity name and famous name. A URL address is provided of a Web page on the Internet to be searched. Next, the Web page is accessed and searched for hits corresponding to the search string. Then, the search results of identified hits are provided within the Web page.

According to another embodiment of the present invention, a system for searching and reporting the incidence of at least one trademark, tradename, celebrity name, and/or famous name on the Internet, includes a computer system having a connection to the Internet and a software program executing on the computer system. The software program is adapted to receive an input of at least one trademark, tradename, celebrity name, and famous name to be searched, to create a search string including at least one trademark, tradename, celebrity name, and famous name, to receive a URL address of a Web page on the Internet to be searched, to access and search the Web page for hits corresponding to the search string, and to provide search results of identified hits within the Web page.

According to yet another embodiment of the present invention, a software program executing on a computer system for searching and reporting the incidence of at least one trademark, tradename, celebrity name, and/or famous name on the Internet, includes instructions for receiving at least one trademark, tradename, celebrity name, and famous name to be searched. The software program has instructions for creating a search string including at least one trademark, tradename, celebrity name, and famous name. Instructions are provided for receiving a URL address of a Web page on the Internet to be searched. The software program also includes instructions for accessing and searching the Web page for hits corresponding to the search string. Instructions are also included for providing search results of identified hits within the Web page.

BRIEF DESCRIPTION OF THE DRAWINGS

FIGS. 3A to 3C illustrate an example of a basic search report generated utilizing a variety of commercially-available search engines;

DETAILED DESCRIPTION

Figure 1:
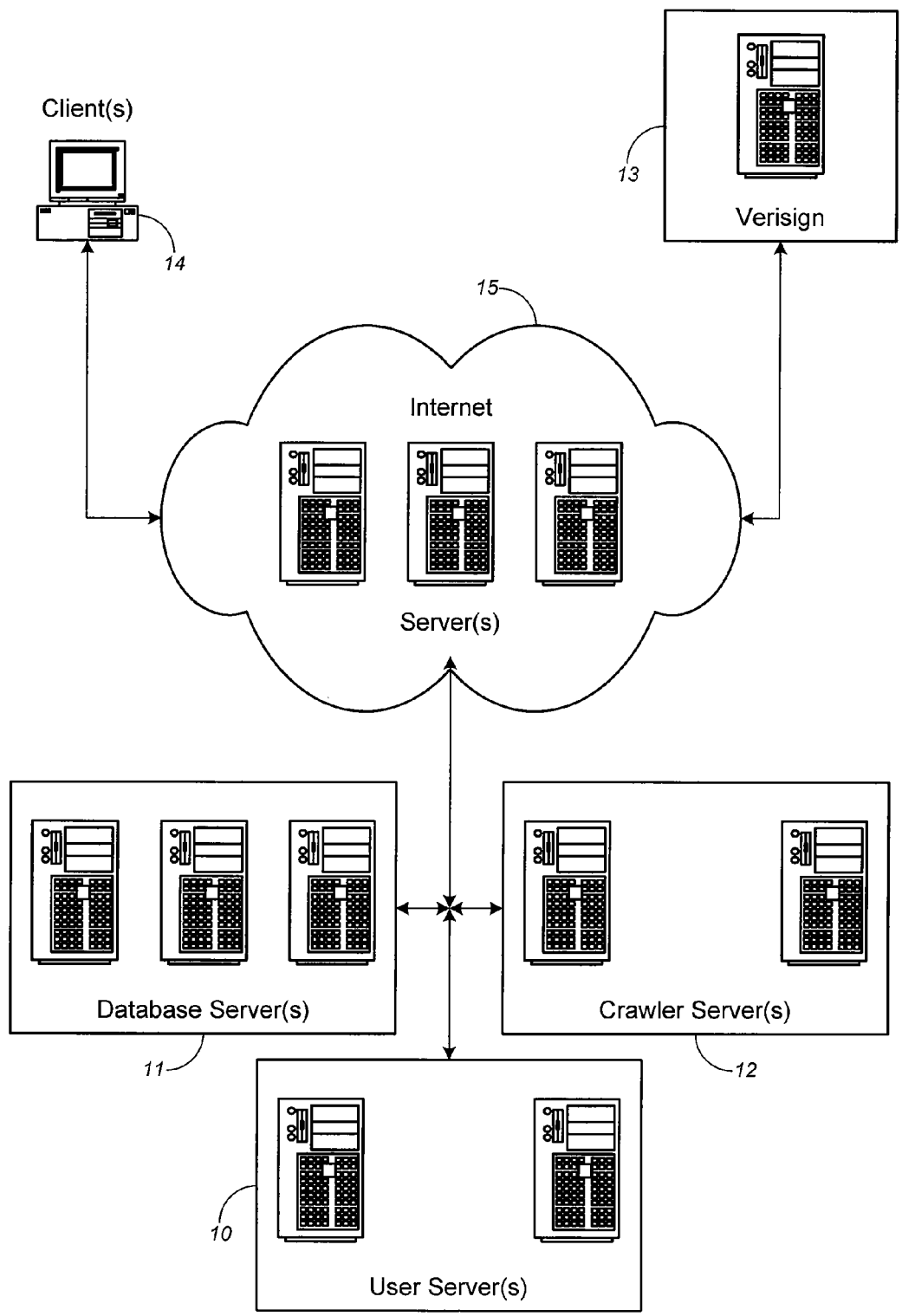
FIG. 1 illustrates a diagram of the inventive apparatus showing the interconnections and communications between the user server(s), crawler servers, database servers and the Internet.

As will be made clear below, the general availability of personal computers and of the Internet and the advent of the present invention make possible mechanisms to enable and encourage legal professionals and other end users to monitor potential trademark and tradename infringement and the unauthorized use of celebrity and/or famous names for commercial gain.

Definitions

Browser is a client program (software) that is used to look at various kinds of Internet resources.

Crawler is a software application that indexes Web pages and other Internet sites by public IP address or top level domain name (e.g., Nike.com).

Domain name is a unique name that identifies an Internet site. Domain names always have two or more parts, separated by dots. The part on the left is the most specific and the part on the right is the most general. A given machine may have more than one domain name but a given domain name points to only one machine. For example, the domain names "matisse.net"; "mail.matisse.net"; and "workshop.matisse.net" can all refer to the same machine, but each domain name can refer to no more than one machine.

FTP (file transfer protocol) is a common method of moving files between two Internet sites. FTP is a special way to login to another Internet site for the purposes of retrieving and/or sending files.

Hidden text is HTML text that is coded with tags to prevent the text from being visible to the end user.

HTML or Hypertext Markup Language is the coding language used to create hypertext documents for use in the Web. HTML looks like typesetting code whereby a block of text is surrounded by codes that indicate how it should appear. In HTML one can specify that a block of text or a word be linked to another file in the Internet.

Hypertext is text that contains commands that communicate with the Browser and tells the Browser how to display text, graphics and multimedia files.

Hit occurs any time a piece of data matches a term in a search string. One example would be the results that are returned from a Yahoo! or other search engine.

Internet is a global speaking computer network of networks whereby the computer networks communicate with each other pursuant to certain protocol. Tens of thousands of such computer networks exist, ranging from university networks to corporate local area networks to large online services (i.e., America Online).

Meta tag is part of the head or top of an HTML document and provides information that describes the document in various ways. It contains information for search engines to use in adding Web pages to their search indexes. It can also be used to search locally for similar files or files that need reviewing or updating. Information in each <META> tag is expressed as a NAME=and value=pair. The NAME can be used to distinguish one type of <META> statement from another.

Newsgroups is the name for discussion groups on the Internet.

Server is a computer and software package that provides a specific kind of service to a client software running on other computers. A single server machine can have several different server software packages running on it and providing many different servers to clients on a network.

SSL (secure sockets layer) is a protocol designed to enable encrypted, authenticated communications across the Internet. SSL is used mostly in communications between Web Browsers and Web Servers. URLs that begin with "http" indicate that an SSL connection will be used. SSL provides privacy, authentication and message integrity. In an SSL connection, each side of the connection must have a security certificate, which each side's software sends to the other. Each side then encrypts what it sends using information from both its own and the other side's certificate, ensuring that only the intended recipient can de-crypt it and that the other side can be sure the data came from the place it claims to have come from, and that the message has not been tampered with.

Title is the name in HTML which is given to the name of a particular HTML document (e.g., <TITLE>Pepsi®HomePage</TITLE<).

Text is the words, sentences and paragraphs on a Web page that is visible to the end-user.

URL (uniform resource locator) is the standard way to give the address of any resource on the Internet that is part of the World Wide Web (e.g., http://www.microsoft.com or ftp://ftp.microsoft.com).

Usenet is a world-wide network of discussion groups, having comments passed among hundreds of thousands of machines. Not all Usenet machines are on the Internet as it is decentralized with many discussion areas called Newsgroups.

Web page is an HTML document that resides on the Web and incorporates text, graphics, sound, and other multimedia elements.

World Wide Web (Web) is a globally-connected network that allows text, graphics, sound files, etc. to be mixed together.

Network Architecture

The components of a preferred embodiment of the present invention are illustrated in FIG. 1. A standard personal computer, computer workstation or computer server with adequate processing power and memory may be used as a User server 10. In one embodiment it operates as a Web server, receiving and responding to client 14 requests for access to the inventive process services. User servers 10 must be capable of rapidly performing database queries as well as handling input and output needs. A Sun Microsystems® 300 MHz UltraSparc® II processor is one example of a CPU that can be used. A similar processor such as a 550 MHz Compaq® Alpha 21164 or 550 MHz Intel® Inc. Pentium® III may also be used. These processors are listed only as examples, and any suitable processor device may be utilized.

Database servers 11 provide a means for storing searches and for accessing such previous searches for determining a history of use of a particular trademark or tradename. The present Web site comprises a database server 11 that stores all prior searches indexed by user identification and search strings so that prior searches can be followed up. The database servers 11 are connected to the search engine servers 12 through the Internet 15, to the user servers 10 and potentially communicating to the client 14 through a Web site operated by the user servers 10. Data storage device(s) used in the database servers 11 consist of storage media such as hard disk magnetic storage, magnetic tape, or CD-ROM drives. Data storage device(s) consist of databases used in the processing of transactions in the present invention.

Process

Figure 2:
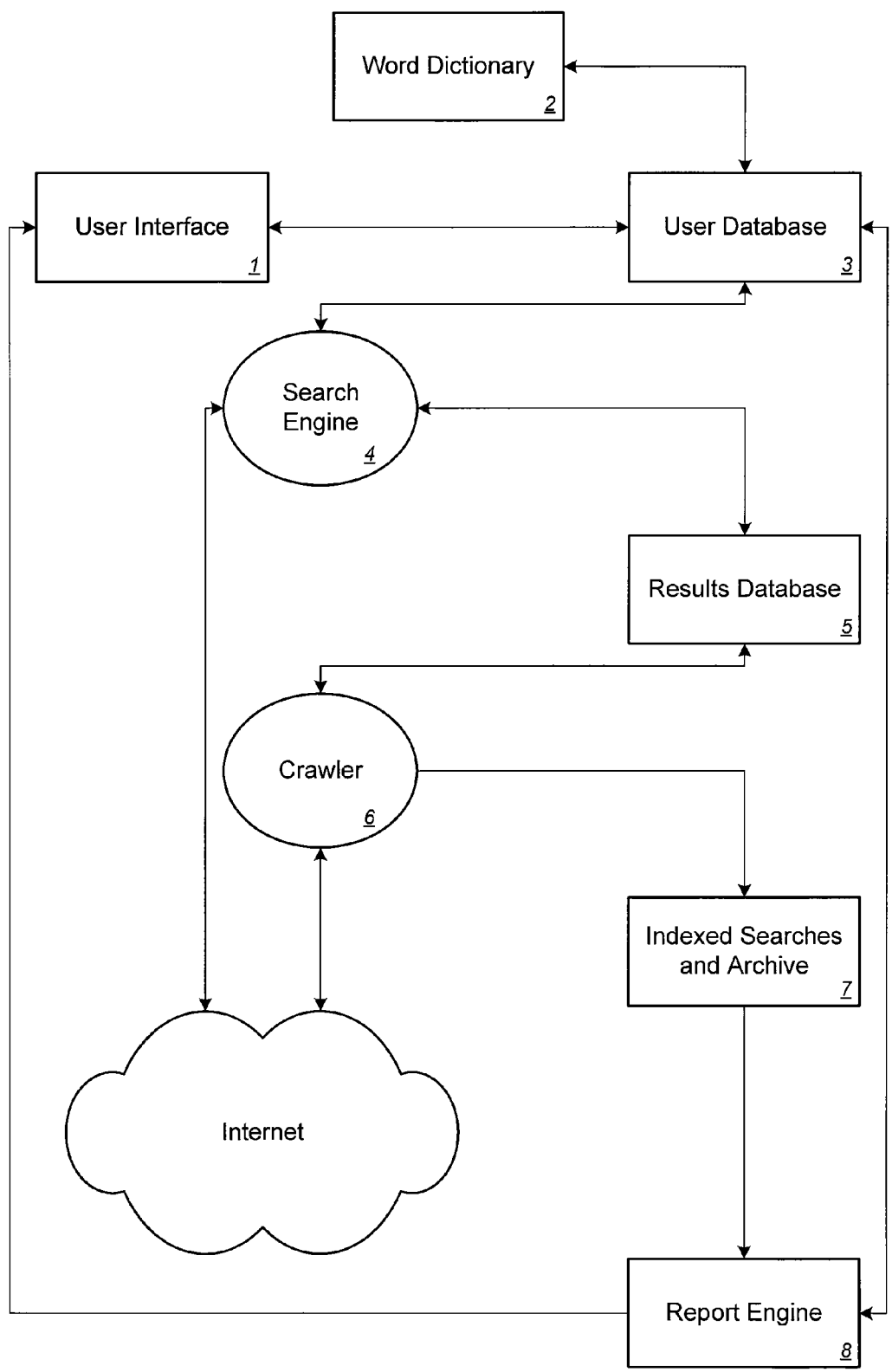
FIG. 2 shows a search flow diagram for listing each step of a hypothetical search using the inventive process.

FIG. 2 shows a search flow diagram for listing each step of a hypothetical search using the inventive process. In step 1, the user enters the search terms and search name for stored search results in the user interface and clicks on "Launch This Search." The search string is sent to the user database, which checks the user input, and returns the proper error messages if needed. If there are no errors on user input then the user is presented with a page stating: "Your search has been launched, we will e-mail you once it is complete." The search term(s) is then compared to a homonym and phonetic (word dictionary) database and concatenated to the search text and stored in the user database to form the search string. See step 2.

The search string is stored in the user database and queued for the next scheduled "universal" search done by the search engine. See step 3.

The inventive process retrieves the search string from the user database and searches the Internet and other search engines. See step 4.

The results of the search are processed and stored into a Results Database or Matrix. Each entry in this database contains mainly the URL of the found pages. See step 5.

The crawler retrieves the URL from the Results Database or Matrix and crawls to the retrieved URL to retrieve the complete Web page. The crawler then processes the returned page, parses the required information and stores the result into an Index Archive. See step 6.

When the search for this search string is completed, the results are fed to the Report Engine. See step 7.

The Report Engine formats the report in the user's preferred report format and is stored in the Users database under the User's profile. See step 8.

The present invention automatically determines homonyms and phonetic equivalents by a reverse spell check lookup. Examples of reverse spell-check lookup include "correct word is like" and reverse spell check lookup would also include "loke", "liki", "lich" and "lick". In MS Word, for example, one can right click on a word and obtain a list of reverse spell check words. Phonetic examples would include "lyk" and "lyke". Phonetic equivalents of "light" would include lite and lyte and lit. Phonetics may be looked up in an on-line dictionary.

In a present embodiment of the invention, the initial search first uses existing search engines to identify hits of the searched text homonyms and phonetic equivalents to form a search string as a first step. However, the results of such a search do not indicate where in the Web site (e.g. Web page) the identified term is located. Therefore, the inventive process uses a crawler in a second step to go to each identified URL where a hit has been located on a search and separately index those identified URLs for the location(s) of the terms in the search string.

FIGS. 3A-3C illustrate an example of a basic search report generated utilizing a variety of commercially-available search engines. The print out shows the results of hits broken down by search engine used in terms of the number of hits and the URLs identified. The crawler then goes to each URL identified with a hit and breaks down the hit locations according to meta tag, hidden text, text, title, domain name, and images. Therefore the report will indicate where on each URL or domain, the hits are located. In a preferred embodiment, the report further prints out the actual text, hidden text, title, domain name, meta-tag, or image with the search term(s) highlighted such that the report can be used as evidence for a request to cease infringing activity.

The present invention further provides the ability to determine the ranking of a Web site according to each search engine. This allows a registered trademark owner to determine in what position an authorized Web Site is ranked in each search engine. Each search engine has different search parameters for ranking. In one embodiment, the search engine provides the user with the ranking regardless of the parameter that the search engine uses. This search uses a customized CGI (Common Gateway Interface) script (standard Internet script) by having it return the rank and URL of each Web site. The crawler is then launched such that the crawler then crawls each Web page to determine the location on the Web page of the search terms of the search string.

The present invention is further able to determine the name and address of the owner of a particular domain name by automatically accessing the InterNIC or registrar "whois" database, wherein the summarized report contains the name and address of each owner of each matching domain name.

A search can be customized in its report format for everything that can be reported. For example, a basic report is illustrated in FIGS. 3A-3C. The report may show the unauthorized use of the "markfamus" trademark in the URLs and/or the meta-tags, which would divert traffic that was intended to go to an authorized "markfamus" site to that of an unauthorized Web site. The report can further identify those unauthorized URLs and obtain the name and address of the owners of such URLs and even print out pages from the unauthorized URLs as proof of unauthorized uses that can be appended to a cease and desist letter sent to the owners of such unauthorized URLs. In addition, the database server keeps track of previous searches and can regularly update any changes made to offending URLs. Therefore, the inventive process provides a valuable Internet-based tool for trademark and tradename owners and for those connected with celebrity and/or famous names to monitor and police their intellectual property rights on the Internet.

In addition, the present invention provides a mechanism for encrypting data and other information crossing between the client/customer of the inventive process service and the server. Such mechanisms for encryption used on the Internet include SSL's and a Verisign server 13.

Figure 4:
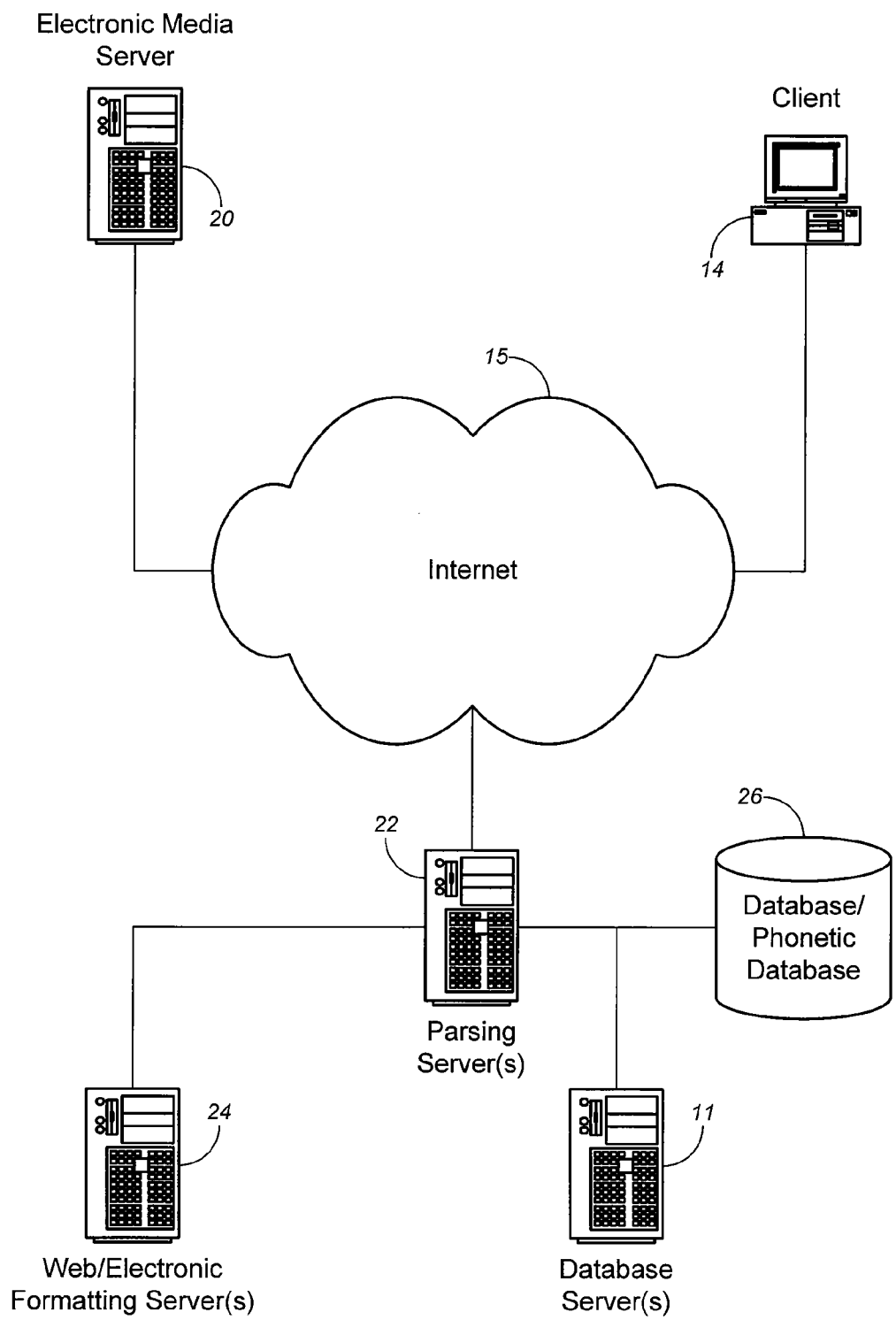
FIG. 4 illustrates a diagram of the components of a keyword matching system for searching a Web page according to an embodiment of the present invention.

FIG. 4 illustrates a diagram of the components of a keyword matching system for searching a Web page according to an embodiment of the present invention. Similar to the system discussed above, the client computer 14 may be connected to the Internet 15 for remote access to the keyword matching system. The keyword matching system is adapted to receive from the user at the client computer 14 a URL address of a Web page to be searched on an electronic media server 20 across the Internet 15. The keyword matching system preferably includes a parsing server 22, which performs keyword matching on the Web page that is retrieved from the URL address provided by the user. A database server 11 may also be incorporated to access a database 26 of homonyms and phonetic equivalents to the keyword(s) being searched so as to additionally search for any such homonyms and phonetic equivalents that may exist within a Web page. The homonyms and phonetic equivalents may be transmitted to the parsing server 22 to allow for the additional search for homonyms and phonetic equivalents within a retrieved Web page. A Web/electronic formatting server 24 may be provided to take the results obtained from the parsing server 22 and present the results in a user-friendly format to the user at the client 14, via a Web browser. All of the servers discussed herein regarding the keyword matching system may be embodied within a single server (computer system), or each individual server discussed above may be each comprised of multiple computer systems.

Figure 5:
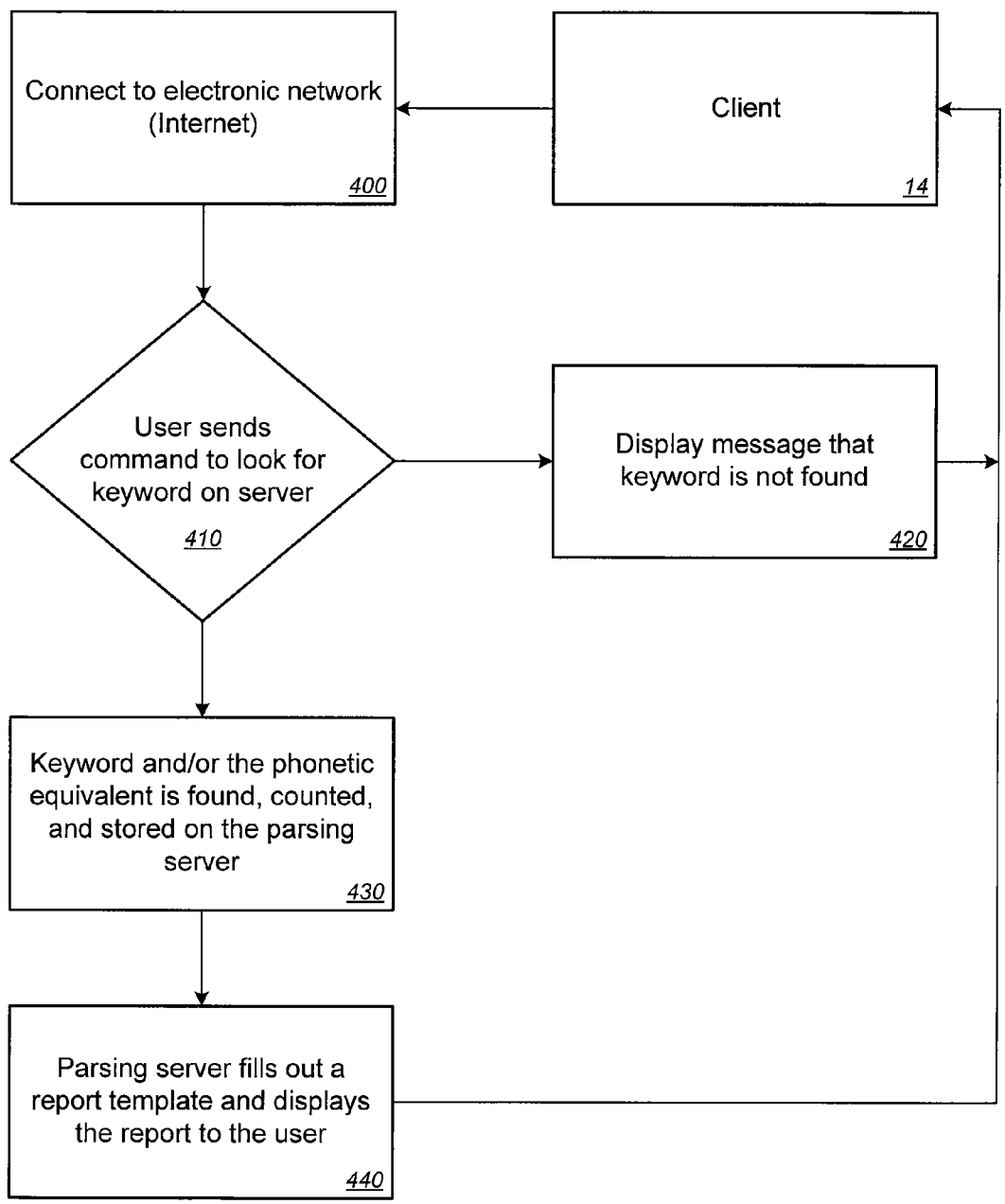
FIG. 5 illustrates a flow chart diagram for searching for keyword matches in the programming code of a Web page according to an embodiment of the present invention.

FIG. 5 illustrates a flow chart diagram for searching for keyword matches in the programming code of a Web page according to an embodiment of the present invention. For example, a Web site may be used for hosting a keyword matching system. The keyword may be a trademark, tradename, celebrity name, and/or famous name to be searched. Although the primary use of the present invention is to search for and monitor trademark-type usages, any other keyword or combination thereof may be searched as well. Using the keyword matching system of the present invention, the user may simultaneously search for matching keywords in the programming code (such as hidden text and meta-tags) and the visible text of a Web page, which information may be later categorized and summarized for the user.

First, the user may remotely connect to the keyword matching system via the Internet, as in step 400. Once the connection is made, the keyword matching system prompts the user to enter a known URL address and a specific keyword or keywords for which the user is searching within the Web page at the URL address. Instead of using a search engine to locate the URL addresses of potentially infringing Web pages, the keyword matching system in FIG. 4 allows the user to input a specific known URL address for a Web page to be analyzed. Upon entry of the URL address and the keyword(s) by the user or any automated process, the keyword matching system accesses the Web page on the Internet with the provided URL address, and subsequently searches the source code (HTML) of the Web page for the requested keyword(s) 410, including conducting a search in the meta-tag section, the hidden text, the visible text, the title, and any hyperlinks within the Web page. Additionally, the search may be conducted of the image text as well, that is, the names of the images on the Web site, such as the names of the image files themselves, or the names or descriptions of the images assigned in the Web page source code. The search string, which may consist of just a single keyword, used to search for any matches within the Web page code may further include a plurality of other words, such as homonyms and phonetic equivalents (as discussed above) to the keyword(s) to be searched 430. If no keywords are located in the Web page, then a message is displayed to the user reporting the same 420.

Once the Web page has been retrieved and analyzed for keyword matches (including any homonyms and phonetic equivalents), the keyword matching system may provide a report 440 to the user by highlighting the keyword(s) and providing the location of the keyword within the Web page, such as, for example, in the title, the meta-tags, the text, the hidden text, the hyperlinks, etc. The keyword matching system may further summarize the number of matches or "hits" within each of these different categories.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of searching and reporting an incidence of at least one of a trademark, a tradename, a celebrity name, or famous name in a Web page on the Internet, comprising:

receiving, from a user, at least one trademark, tradename, celebrity name, or famous name to be searched in the Web page on the Internet;

automatically creating a search string based on the at least one trademark, tradename, celebrity name, or famous name entered by the user;

receiving a Uniform Resource Locator (URL) address of the Web page on the Internet to be searched;

accessing and searching contents of the Web page of the URL address received for matches in the contents of the Web page corresponding to the search string, wherein the searched contents includes elements other than only a domain name;

providing search results of identified matches in the contents of the Web page corresponding to the search string, wherein the search results are extracted from the Web page, categorized, and formatted in a report, each category including at least one character string corresponding to a number of occurrences of the identified matches within a category, the category selected from the group consisting of a meta-tag, a hidden text, a text, a title, a hyperlink, and an image text, and wherein the report displays at least one character string in a column format for at least one of the meta-tag, the hidden text, the text, the title, the hyperlink, and the image text, and wherein the search results highlight the at least one trademark, tradename, celebrity name, or famous name found in the Web page; and determining an unauthorized use of the at least one trademark, tradename, celebrity name, or famous name;

wherein the at least one trademark, tradename, celebrity name, or famous name to be searched is provided in an encrypted connection authenticated by a certificate server.

2. The method of searching and reporting according to claim 1, wherein the at least one character string is a number of the identifying matches within the category.

3. The method of searching and reporting according to claim 1, wherein the searched contents includes at least two of the following portions of the Web page: a domain name, a meta tag, hidden text, visible text, titles, and images.

4. A method of searching and reporting an incidence of at least one of a trademark, a tradename, a celebrity name, or a famous name in a Web page on the Internet, comprising:

receiving, from a user, at least one trademark, tradename, celebrity name, or famous name to be searched in the Web page on the Internet;

automatically creating homonyms and phonetic equivalents of the at least one trademark, tradename, celebrity name, or famous name entered by the user;

automatically creating a search string including the at least one trademark, tradename, celebrity name, or famous name and the automatically created homonyms and phonetic equivalents based on the at least one trademark, tradename, celebrity name, or famous name entered by the user;

receiving a Uniform Resource Locator (URL) address of the Web page on the Internet to be searched;

accessing and searching contents of the Web page of the URL address received for matches in the contents of the Web page corresponding to the search string, wherein the searched contents includes elements other than only a domain name;

providing search results of identified matches in the contents of the Web page corresponding to the search string, wherein the search results are extracted from the Web page, categorized, and formatted in a report, each category including at least one character string corresponding to a number of occurrences of the identified matches within a category, the category selected from the group consisting of a meta-tag, a hidden text, a text, a title, a hyperlink, and an image text, and wherein the report displays at least one character string in a column format for at least one of the meta-tag, the hidden text, the text, the title, the hyperlink, and the image text, and wherein the search results highlight the at least one trademark, tradename, celebrity name, or famous name found in the Web page;

determining an unauthorized use of the at least one trademark, tradename, celebrity name, or famous name;

obtaining information relating to an owner of the URL address conducting the unauthorized use; and informing the owner of the unauthorized use;

wherein the at least one trademark, tradename, celebrity name, or famous name to be searched is provided in an encrypted connection authenticated by a certificate server.

5. The method of searching and reporting according to claim 4, wherein the searched contents includes at least two of the following portions of the Web page: a domain name, a meta tag, hidden text, visible text, titles, and images.

6. The method of searching and reporting according to claim 4, wherein the at least one character string is a number of the identifying matches within the category.

7. The method for searching and reporting according to claim 4, wherein the information relating to the owner of the URL address conducting the unauthorized use includes a name and an address of the owner.

8. The system method for searching and reporting according to claim 4, wherein informing the owner of the unauthorized use includes delivering a cease and desist letter.

* * * * *

UNITED STATES PATENT AND TRADEMARK OFFICE
CERTIFICATE OF CORRECTION

PATENT NO. : 7,346,605 B1  Page 1 of 1
APPLICATION NO. : 09/612766
DATED : March 18, 2008
INVENTOR(S) : James L. Hepworth and Faisal Shah It is certified that error appears in the above-identified patent and that said Letters Patent is hereby corrected as shown below:

Title Page item 73

Name of Assignee: EMARK MONITOR, INC.

should be corrected to read as follows:

Name of Assignee: MARKMONITOR INC.

Signed and Sealed this

Twenty-ninth Day of April, 2008

JON W. DUDAS
*Director of the United States Patent and Trademark Office*